United States Patent [19]

Chen et al.

[11] Patent Number: 5,639,422
[45] Date of Patent: Jun. 17, 1997

[54] REDUCING CORROSION OF CARBON STEEL REBOILERS

[75] Inventors: Chao-Peng Chen, Getzville; Tilak V. Bommaraju, Grand Island, both of N.Y.; Paul C. Williams, Grapevine, Tex.

[73] Assignee: Occidental Chemical Corporation, Niagara Falls, N.Y.

[21] Appl. No.: 691,476

[22] Filed: Aug. 2, 1996

[51] Int. Cl.$^6$ .................................................. C23F 11/04
[52] U.S. Cl. ........................................... 422/7; 252/387
[58] Field of Search ............................... 422/7; 252/387

[56] References Cited

U.S. PATENT DOCUMENTS 4,138,296  2/1979  Balko et al. ........................... 423/481
5,437,711  8/1995  Kaplin et al. ........................ 423/245.1

OTHER PUBLICATIONS

Balezin, S.A.; Keilin, I.I. (USSR) Ingibitory Korroz Met., 26–9, Abstract, "Effect of halide ions on the corrosion of steel in sulfuric acid".

*Primary Examiner*—Timothy McMahon
*Attorney, Agent, or Firm*—Richard D. Fuerle; Arthur S. Cookfair

[57] ABSTRACT

Disclosed is a method of reducing the corrosion of a carbon steel reboiler in which a reboiler fluid containing nitrogen trichloride is heated to decompose the nitrogen trichloride. About 1 to about 100 ppm, based on the reboiler fluid weight, of a source of iodine, is added to the reboiler.

19 Claims, No Drawings

REDUCING CORROSION OF CARBON STEEL REBOILERS

BACKGROUND OF THE INVENTION

This invention relates to a method of reducing the corrosion of a carbon steel reboiler in which a reboiler fluid containing nitrogen trichloride is heated to decompose the nitrogen trichloride. In particular, it relates to the addition to the reboiler of about 1 to about 100 parts ppm of a source of iodine.

When brine is electrolyzed to produce caustic and chlorine, ammonia in the brine can result in the production of nitrogen trichloride, $NCl_3$. Nitrogen trichloride is an explosive gas and it is essential that it be removed from the chlorine before its concentration builds up to explosive levels. Its removal from the chlorine is accomplished by contacting the chlorine with a reboiler fluid that absorbs nitrogen trichloride. The reboiler fluid containing the absorbed nitrogen trichloride is heated in the reboiler to a temperature in the range of 40°–60° C., which results in the decomposition of the nitrogen trichloride into nitrogen and chlorine, which is recycled.

While this process is effective at destroying nitrogen trichloride, it rapidly corrodes carbon steel reboilers. The reboilers are corroded so rapidly that it is necessary to replace them at considerable expense every three or four months. The use of reboilers made of less corrosive materials, such as Hastelloy, a nickel-iron alloy, has been considered, but such reboilers are far more expensive than carbon steel reboilers. Since the reboiler fluid contains virtually no water, the source of the corrosion has been a mystery and an effective anti-corrosion agent has not been found.

SUMMARY OF THE INVENTION

We have now discovered that the addition of about 1 to about 100 ppm of a source of iodine to the reboiler fluid of a carbon steel reboiler used to decompose nitrogen trichloride is extremely effective in reducing its corrosion. The corrosion rate of reboilers treated according to the process of this invention has been reduced by factors of well over a hundred. The addition of small amounts of relatively inexpensive potassium iodide or sodium iodide to the reboiler fluid according to this invention can result in the use of many times fewer reboilers, at a significant cost savings. Surprisingly, we have also discovered that the iodine in the reboiler fluid promotes the decomposition of the nitrogen trichloride.

Description of the Preferred Embodiments

This invention applies to reboilers that are made of carbon steel. The corrosion rate of carbon steel reboilers varies according to the circumstances of their use. While the method of this invention may be helpful in those carbon steel reboilers in which the corrosion rate is already low, it is, of course, most useful in those reboilers where the corrosion rate is very high, at least 20 mpy (mils per year) (20 mpy=0.5 mm per year).

The invention applies to processes in which a reboiler fluid is used to absorb nitrogen trichloride from chlorine gas and is heated in the reboiler (typically at a temperature of about 40° to about 60° C.) to decompose the nitrogen trichloride into nitrogen and chlorine. A typical reboiler fluid, prior to heating, may contain 10,000 to about 15,000 ppm chlorine, about 200 to about 8000 ppm nitrogen trichloride, and virtually no (less than 1 ppm) water.

The reboiler fluid is a liquid that readily absorbs nitrogen trichloride, and the invention applies to virtually any reboiler fluid. Examples of fluids that are suitable as reboiler fluids include carbon tetrachloride, chloroform, ethylene dichloride (1,2-dichloroethane), and parachlorobenzotrifluoride. Previously, carbon tetrachloride was used as a reboiler fluid, but it has now been ruled environmentally unacceptable and is being replaced by other fluids such as chloroform and ethylene dichloride (see U.S. Pat. No. 5,437,711). The preferred reboiler fluids are chloroform and ethylene dichloride because they are effective and environmentally acceptable.

To reduce corrosion of the reboiler, a source of iodine, such as a salt of iodine, is added to the reboiler in an amount of about 1 to about 100 parts (of iodine) per million parts by weight of the reboiler fluid. Less iodine is not very effective and more iodine is usually unnecessary; preferably, the amount of iodine is about 2 to about 20 ppm. The iodine may be added in almost any form, such as an alkali metal salt (potassium iodide or sodium iodide), an alkaline earth metal salt (such as calcium iodide or magnesium iodide), or as elemental iodine, $I_2$. It is preferably added as either potassium iodide or sodium iodide as those salts are inexpensive and easy to handle.

Since the iodine can be gradually lost from the reboiler over time, the level of iodine in the reboiler should be maintained at about 1 to about 100 ppm, and preferably at about 2 to about 20 ppm. This can be accomplished by testing the reboiler fluid for the presence of iodine from time to time and adding more iodine as is necessary. It should be noted that iodine seems to be peculiarly effective in reducing this type of corrosion as bromine was also tried but had no effect.

The addition of iodine to the reboiler fluid also promotes the decomposition of nitrogen trichloride. While we do not wish to be bound by any theories, we believe that the following cyclic reaction scheme may occur in the presence of small amounts of iodide:

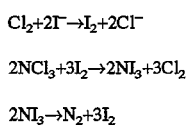

The decomposition of nitrogen trichloride is promoted because $NI_3$ decomposes at a lower temperature than $NCl_3$.

The following examples further illustrate this invention.

EXAMPLE 1

The addition of 10 ppm of potassium iodide to a chlorine reboiler fluid (chloroform) taken from a chlor-alkali plant decreased the corrosion rate of an A-516-70 carbon steel coupon at 62° C. from 437 mpy to 2 mpy. (11.1 to 0.05 mm per year).

EXAMPLE 2

The addition of 10 ppm of potassium iodide to a chlorine reboiler fluid (chloroform) taken from a chlor-alkali plant decreased the corrosion rate of a C-1010 carbon steel coupon at 62° C. from 214 mpy to 5 mpy (5.4 to 0.13 mm per year).

EXAMPLE 3

The addition of 10 ppm of potassium iodide to a chlorine reboiler fluid (chloroform) taken from a chlor-alkali plant at 62° C. for 4 hours decreased the nitrgoen trichloride level from 3098 ppm to less than 200 ppm.

EXAMPLE 4-COMPARATIVE

Example 1 was repeated using potassium bromide. The corrosion level was 229 mpy (5.8 m per year) without potassium bromide, 220 mpy (5.6 mm per year) with 1 ppm potassium bromide, and 239 mpy (6.1 mm per year) with 10 ppm potassium bromide.

We claim:

1. A method of reducing the corrosion of a carbon steel reboiler in which a reboiler fluid containing nitrogen trichloride is heated to decompose said nitrogen trichloride, comprising adding to said reboiler fluid about 1 to about 100 ppm, based on said reboiler fluid weight, of a source of iodine.

2. A method according to claim 1 wherein said source of iodine is KI.

3. A method according to claim 1 wherein said source of iodine is NaI.

4. A method according to claim 1 wherein said reboiler fluid is chloroform.

5. A method according to claim 1 wherein said reboiler fluid is ethylene dichloride.

6. A method according to claim 1 wherein the water content in said reboiler is less than 1 ppm.

7. A method according to claim 1 wherein about 2 to about 20 ppm of said source is added to said reboiler.

8. In a reboiler made of carbon steel in which a reboiler fluid is heated to decompose nitrogen trichloride, a method of reducing the corrosion of said reboiler and promoting the decomposition of said nitrogen trichloride comprising maintaining in said reboiler fluid about 1 to about 100 ppm, based on said reboiler fluid weight, of a salt of iodine.

9. A method according to claim 8 wherein said salt is KI.

10. A method according to claim 8 wherein said salt is NaI.

11. A method according to claim 8 wherein said reboiler fluid is chloroform.

12. A method according to claim 8 wherein said reboiler fluid is ethylene dichloride.

13. A method according to claim 8 wherein the water content in said reboiler is less than 1 ppm.

14. A method according to claim 8 wherein about 2 to about 20 ppm of said salt is added to said reboiler.

15. In a method of decomposing nitrogen trichloride in chlorine gas wherein a reboiler fluid absorbs said nitrogen trichloride and is heated in a carbon steel reboiler to a temperature sufficient to decompose said nitrogen trichloride into nitrogen and chlorine, where said reboiler is subject to at least 20 mpy of corrosion, a method of reducing the corrosion rate of said reboiler comprising maintaining therein about 1 to about 100 ppm of potassium iodide or sodium iodide.

16. A method according to claim 15 wherein said reboiler fluid is chloroform.

17. A method according to claim 15 wherein said reboiler fluid is ethylene dichloride.

18. A method according to claim 15 wherein the water content in said reboiler is less than 1 ppm.

19. A method according to claim 15 wherein about 2 to about 20 ppm potassium iodide or sodium iodide is added to said reboiler.

* * * * *